(12) United States Patent
Thomas et al.

(10) Patent No.: US 10,994,696 B2
(45) Date of Patent: May 4, 2021

(54) SYSTEM AND METHOD DETERMINING SEATBELT WEBBING PAYOUT

(71) Applicant: GM Global Technology Operations LLC, Detroit, MI (US)

(72) Inventors: Scott D. Thomas, Novi, MI (US); Mathew L. Nassoiy, Milford, MI (US); Jason L. Hepner, Davisburg, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 195 days.

(21) Appl. No.: 16/149,730

(22) Filed: Oct. 2, 2018

(65) Prior Publication Data

US 2020/0101934 A1   Apr. 2, 2020

(51) Int. Cl.
  *B60R 22/44*   (2006.01)
(52) U.S. Cl.
  CPC ...... *B60R 22/44* (2013.01); *B60R 2022/4413* (2013.01)

(58) Field of Classification Search
  CPC ......... B60R 22/34; B60R 22/44; B60R 22/48; B60R 2022/4413; B60R 2022/4825
  See application file for complete search history.

(56) References Cited

U.S. PATENT DOCUMENTS

| | | | | |
|---|---|---|---|---|
| 2006/0231663 A1* | 10/2006 | Burkart | .................... | B60R 22/46 242/374 |
| 2011/0278905 A1* | 11/2011 | Ikeda | ....................... | B60R 22/34 297/475 |
| 2014/0117139 A1* | 5/2014 | Odate | ..................... | B60R 22/46 242/390.9 |
| 2017/0327078 A1* | 11/2017 | Son | ......................... | B60R 22/44 |

* cited by examiner

*Primary Examiner* — Sang K Kim (57) ABSTRACT

A seatbelt retractor includes a retractor frame, a spool fixed for common rotation with a spool shaft, a seatbelt webbing wrapped around the spool, a reduction mechanism, and a sensor coupled to the reduction mechanism for sensing the movement of the spool.

9 Claims, 5 Drawing Sheets

SYSTEM AND METHOD DETERMINING SEATBELT WEBBING PAYOUT

INTRODUCTION

The present disclosure relates to seatbelt retractor systems and methods for detecting seatbelt webbing payout from a seatbelt retractor.

Seatbelt systems for restraining occupants in a motor vehicle, generally, employ seatbelt retractors. The seatbelt retractors have a spool around which a seatbelt webbing is wound. The seatbelt webbing may be unwound from the spool by a vehicle occupant and secured around the vehicle occupant by inserting a latch plate coupled to the seatbelt webbing into a seatbelt buckle. When not in use the seatbelt retractor through the aid of a spring retracts the seatbelt webbing into the retractor and onto the spool.

Thus, while current seatbelt systems achieve their intended purpose, there is a need for a new and improved system and method for securing vehicle occupants with a seatbelt. The new and improved method should be capable of determining seatbelt webbing payout.

SUMMARY

According to several aspects, a seatbelt retractor includes, a retractor frame, a spool fixed for common rotation with a spool shaft, a seatbelt webbing wrapped around the spool, a reduction mechanism coupled to the spool shaft, for receiving a first rate of movement of the spool and converting the first rate of movement of the spool to a second rate of movement of the reduction mechanism, and a sensor in communication with the reduction mechanism for sensing the movement of the spool. The spool shaft is rotatably supported in the retractor frame. The first rate of movement is greater than the second rate of movement.

In an additional aspect of the present disclosure, a spool spur gear is attached for common rotation with the spool and coupled to the reduction mechanism.

In another aspect of the present disclosure, the reduction mechanism further includes a first gear in communication with the spool spur gear.

According to several aspects, the reduction mechanism further includes a second spur gear in communication with the first spur gear of the reduction mechanism.

In another aspect of the present disclosure, the sensor is a potentiometer having a potentiometer shaft fixed for common rotation with the reduction mechanism, thereby rotation of the reduction mechanism changes a response level in the potentiometer.

According to several aspects, the reduction mechanism is a ring gear having a plurality of internal teeth in communication with the spool spur gear.

In another aspect of the present disclosure, a spool pulley is attached to the spool shaft and in communication with the reduction mechanism.

In another aspect of the present disclosure, the reduction mechanism further includes a first pulley in communication with the spool pulley by a belt.

In another aspect of the present disclosure, the reduction mechanism further includes a second pulley in communication with to the first pulley by a belt.

In another aspect of the present disclosure, the reduction mechanism further includes a first spur gear in communication with the spool spur gear and a toothed belt in communication with the first spur gear and a second spur gear rotatable attached to the retractor frame.

In another aspect of the present disclosure, the reduction mechanism further includes a first spur gear in communication with the spool spur gear and a toothed rack in communication with the second spur gear, wherein the toothed rack is slidably engaged with at least one rail mounted to the retractor frame.

In another aspect of the present disclosure, the reduction mechanism further includes a worm gear attached to the spool shaft and a spur gear in communication with the worm gear.

In another aspect of the present disclosure, the reduction mechanism further includes a worm gear attached to the spool shaft and a threaded nut in communication with the worm gear and wherein the threaded nut has at least one wing and wherein the at least one wing is engaged with a guide rail mounted to the retractor frame.

In yet another aspect of the present disclosure, a method for sensing seatbelt webbing payout from a seatbelt retractor includes: providing a retractor frame, providing a spool fixed for common rotation with a spool shaft, wrapping a seatbelt webbing around the spool, coupling a reduction mechanism to the spool, and sensing the movement of the spool using a sensor coupled to the reduction mechanism. The rate of movement of the spool is higher than a rate of movement of the reduction mechanism. The spool shaft is rotatably supported in the retractor frame.

In another aspect of the present disclosure, the method further includes attaching a spool spur gear to the spool shaft and coupling the first spur gear to the reduction mechanism.

In another aspect of the present disclosure, coupling a reduction mechanism further includes meshing a first spur gear with the spool spur gear.

In still another aspect of the present disclosure, coupling the reduction mechanism further comprises meshing a second spur gear with the first spur gear of the reduction mechanism.

In yet another aspect of the present disclosure, sensing the movement of the spool further includes coupling a potentiometer having a potentiometer shaft fixed to the second spur gear of the reduction mechanism, thereby rotation of the second spur gear changes a response level in the potentiometer.

In yet another aspect of the present disclosure, a seatbelt retractor includes: a retractor frame, a spool fixed for common rotation with a spool shaft, a seatbelt webbing wrapped around the spool, a spool gear fixed for common rotation with the spool shaft, a reduction mechanism having a first spur gear in mesh with the spool gear and a second spur gear in mesh with the first spur gear, and a sensor coupled to the second spur gear for sensing the rotation of the spool. The spool shaft is rotatably supported in the retractor frame. The rate of rotation of the first spur gear is higher than a rate of rotation of the second spur gear.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1A:
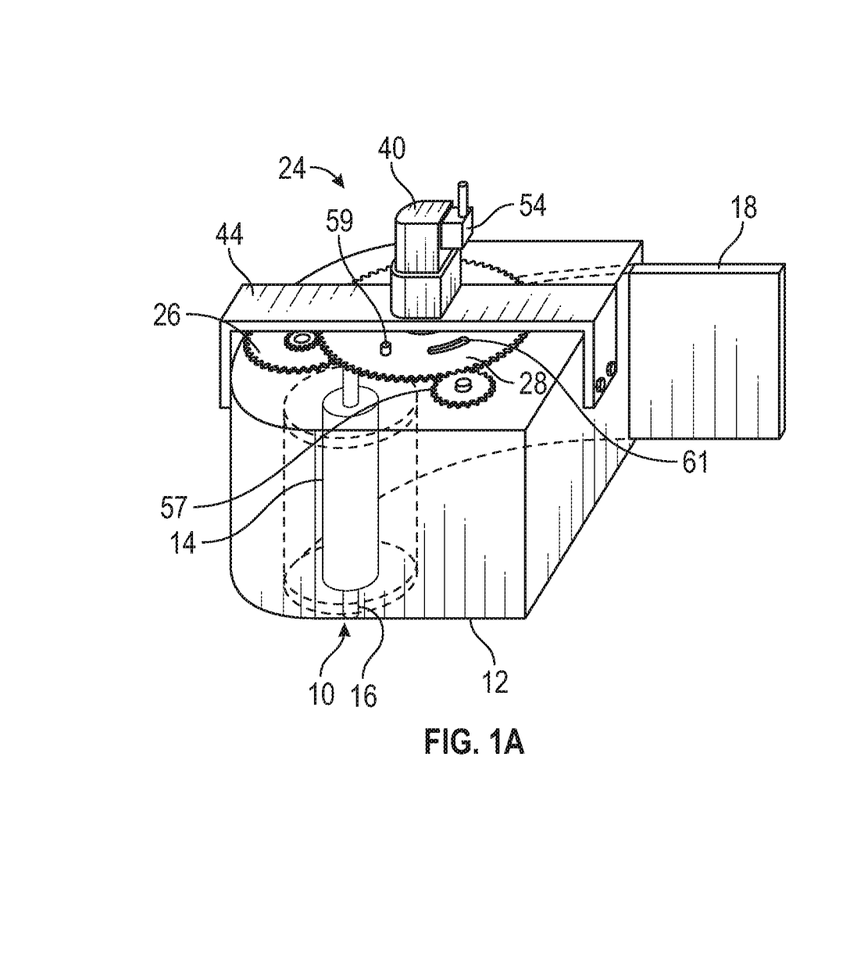
FIGS. 1a and 1b are perspective and exploded views of a seatbelt retractor according to an exemplary embodiment.
Figure 1B:
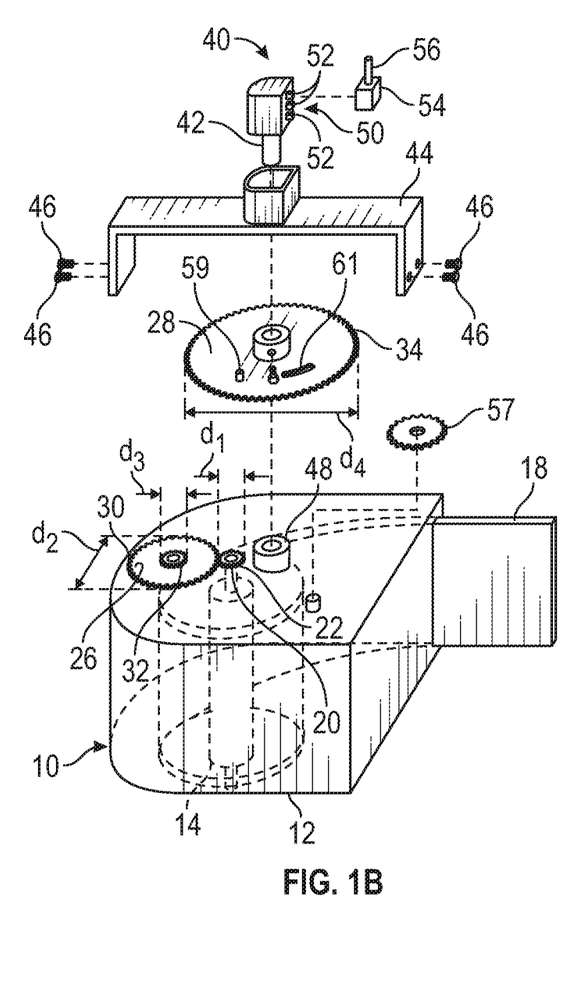

Referring to FIGS. 1a and 1b, perspective and exploded views of a seatbelt retractor 10 are illustrated in accordance with an aspect of the invention. Seatbelt retractor 10 is configured for attachment to a passenger vehicle. As a safety restraint, seatbelt retractor 10 is utilized by a vehicle occupant or a device such as a wheel chair to restrict the movement of the occupant during vehicle deceleration. Seatbelt retractor 10 has a retractor frame 12. Retractor frame 12 is secured to a structural member of a vehicle or to the occupant seat of the vehicle with a bolt threaded into a threaded hole or nut welded to the vehicle body or frame or by another mechanical means. The occupant seat of the vehicle (when present) is in turn secured to a structural member of the vehicle such as a vehicle frame or body.

Moreover, retractor 10 includes a spool 14 fixed for common rotation with a spool shaft 16. The spool 14 may be of a different geometry than shown in the Figures as the spool 14 has been simplified for these illustrations. For instance, conventional spools contain a seatbelt webbing attachment device and some locking teeth that interact with other seatbelt retractor members to lock the spool's rotation. Spool shaft 16 may be a separate element fastened to the spool 14 or may be integrally formed with spool 14 as one member. Retractor frame 12 is configured to rotatably support the spool shaft 16 and, thus, spool 14 can freely rotate in the retractor frame 12. A seatbelt webbing 18 is attached to the spool 14 and wrapped around the spool 14 when in a retracted state. The seatbelt webbing 18 may be drawn out from the seatbelt retractor 10 by a vehicle occupant by pulling on the webbing and unwinding the webbing 18 from the spool 14.

In an embodiment of the present invention, a spool spur gear 20 is provided and fixed for common rotation with the spool shaft 16. Spool spur gear 20 is attached to one end of spool shaft 16 through mechanical means. For example, spool spur gear 20 may be a spur gear having a central aperture that is shaped to cooperate with an opposite shape formed in the end of the spool shaft 16, such that the spur gear is keyed to the end of the spool shaft 16. Alternatively, the spool spur gear 20 could be integral to the spool shaft 16. Spool spur gear 20 is a conventional spur gear having a diameter d1 and a plurality of teeth 22 configured to mesh with a plurality of teeth on another spur gear or toothed member, as will be described in further detail below. A spur gear in the instant disclosure may have straight or curved teeth to mesh with the profile for the accompanying gear or toothed member.

With continuing reference to FIGS. 1a and 1b, a reduction mechanism 24 is illustrated, in accordance with an aspect of the present invention. Reduction mechanism 24 includes an input member or spur gear 26 and an output member or spur gear 28. An aperture or mounting hole (not shown) in frame 12 cooperates with an integrally formed or separately attached shaft in spur gear 26 to rotatably fix spur gear 26 for free rotation on frame 12. Spur gear 26 has a first gear portion having a diameter $d_2$ that has a first plurality of teeth 30 that are in mesh with the plurality of teeth 22 on the spur gear 20. Spur gear 26 further includes a second gear portion having a diameter $d_3$ that has a second plurality of teeth 32 that are in mesh with the plurality of teeth 34 on the spur gear 28. Spur gear 28 has a diameter $d_4$. A rotary joint or shaft is provided and mounted on the retractor frame 12 or to a part attached to the retractor frame 12 for rotatably supporting a member or gear of the reduction mechanism 24.

Retractor 10 further includes a sensor 40 for sensing the rotation of the spool 14. Sensor 40 has a sensor shaft 42 coupled to the spur gear 28 such that rotation of the spur gear 28 will rotate sensor shaft 42. In an aspect of the present invention, sensor 40 is a potentiometer sensor that outputs a response, in this case a resistance value for each degree of rotation of sensor shaft 42. For example, the potentiometer manufactured or offered by Vishay having the model number 140 is a suitable potentiometer sensor 40 for use in retractor 10 of the present invention. Other output responses other than resistance may be provided based on the type of sensor used, such as voltage. This disclosure contemplates all output response types. Moreover, sensor 40 may be mounted on either side of the spur gear 28.

Sensor 40 is mounted on a sensor mounting bracket 44. Sensor mounting bracket 44 is fastened with fasteners 46 or otherwise mechanically attached to the frame 12 of retractor 10 and may be part of an external cover or a separate structure. An aperture or through hole (not shown) is provided in sensor mounting bracket 44 for receiving the sensor shaft 42 therethrough. Sensor shaft 42 is seated for free rotation in a bushing or mounting boss 48 fixed to frame 12. A sensor connector 50 has electrical contacts 52 for outputting the current resistance value or other output of the potentiometer. A vehicle connector 54 mates with sensor connector 50 for transmitting the electrical output of sensor 40 to a vehicle wire harness 56. The vehicle wire harness transmits the resistance value or other output of the sensor 40 to an electronic module for processing and for use of the resistance value in a control algorithm. The control algorithm is configured to at least determine the degree or amount of rotation the spur gear 20 has undergone based on the resistance value of the potentiometer or sensor 40. The diameter $d_1$ of spur gear 20 is less than the diameter $d_2$ of spur gear 26, thus a gear reduction occurs between spur gear 20 and spur gear 26. In other words, the rate of rotation and angular rotation change of spur gear 26 is less than the rate of rotation and angular rotation change of spur gear 20. Consequently, it will take more than one revolution of spur gear 20 to rotate spur gear 26 one full rotation. Moreover, the diameter $d_3$ of spur gear 26 is less than the diameter $d_4$ of spur gear 28, thus a gear reduction occurs between spur gear 26 and spur gear 28. It follows that, the rate of rotation and angular rotation change of spur gear 28 will be less than the rate of rotation and angular rotation change of spur gear 26. Consequently, it will take more than one revolution of spur gear 26 to rotate spur gear 28 one full rotation. Thus, reduction mechanism 24 includes an input member coupled to the spool 14 through spool shaft 16 which in this embodiment is spur gear 20. The reduction mechanism 24 ultimately is coupled to sensor 40. Spur gear 26 and spur gear 28 are intermediate members that convert the relatively higher rate of movement of the spool 14 to a lower rate of movement of sensor shaft 42. Spur gear 28 is also a communication member which communicates the reduced rate of movement to the sensor 40.

Reduction mechanism 24, is configured to interact with conventional retractor mechanisms such as an automatic locking retractor mechanism or a seatbelt entrapment detection mechanism. A gear 57 could be part of the automatic locking retractor mechanism or the seatbelt entrapment detection mechanism, likewise a receptacle (not shown) for a pin 59 or a pin (not shown) for a slot or hole 61 could interface with spur gear 28 or any other portion of the reduction mechanisms of the embodiments described herein.

Figure 2A:
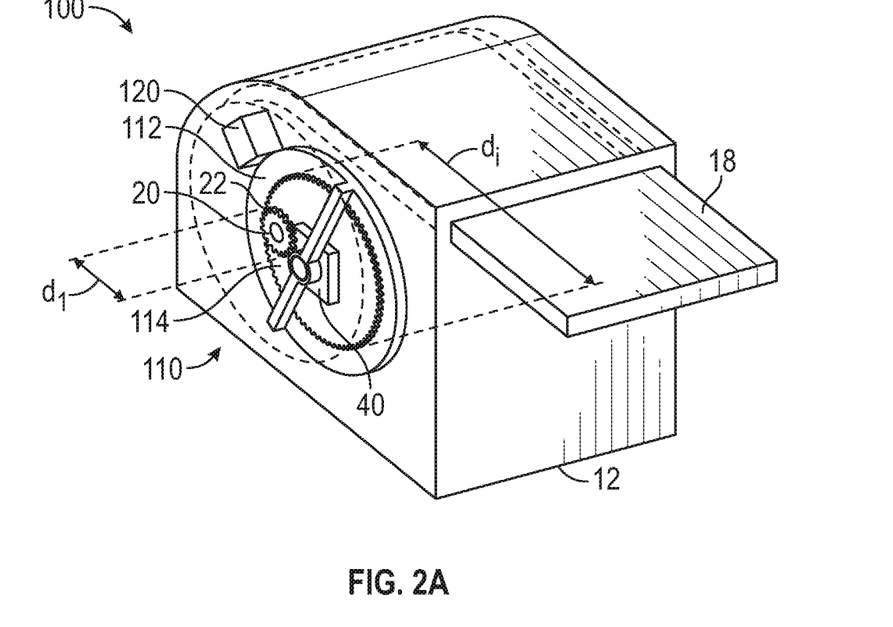
FIGS. 2a and 2b are perspective views of a seatbelt retractor having alternate reduction mechanisms according to an exemplary embodiment.

Referring now to FIG. 2a, a perspective view of a seatbelt retractor 100 having an alternate reduction mechanism 110 is illustrated in accordance with another aspect of the invention. Seatbelt retractor 100 has the same components as seatbelt retractor 10 described above, except for alternate reduction mechanism 110, as hereinafter specified. In the instant embodiment, reduction mechanism 110 includes a ring gear 112 having internal gear teeth 114. Internal gear teeth 114 meshes with the plurality of teeth 22 on spur gear 20. Spur gear 20 has a diameter $d_1$ and ring gear 112 has an internal ring gear diameter $d_i$. The diameter $d_1$ of spur gear 20 is less than the diameter $d_i$ of ring gear 112, thus a gear reduction occurs between spur gear 20 and ring gear 112. In other words, the rate of rotation and angular rotation change of ring gear 112 is less than the rate of rotation and angular rotation change of spur gear 20. Consequently, it will take more than one revolution of spur gear 20 to rotate ring gear 112 one full rotation. The same sensor 40 or potentiometer having a shaft fixed for common rotation with ring gear 112 may be used in the instant embodiment to output a response that may be correlated to the number of rotations of spur gear 20 and thus spool 14. In addition, the potentiometer 40 can be located on either side of the ring gear 112. Alternatively, an optical sensor or magnetic field sensor 120 located on frame 12 outside of ring gear 112 may be used to track the rotation of ring gear 112 and thus the rotation of spool 14. Thus, alternate reduction mechanism 110 includes an input member coupled to the spool 14 through spool shaft 16 which in this embodiment is spur gear 20. The alternate reduction mechanism 110 ultimately is coupled to sensor 40. Ring gear 112 is an intermediate member that reduces the rate of movement from a relatively high rate of movement of the spool to a lower rate of movement of sensor shaft 42. Spur gear 28 is also a communication member which communicates the reduced rate of movement to the sensor 40.

Figure 2B:
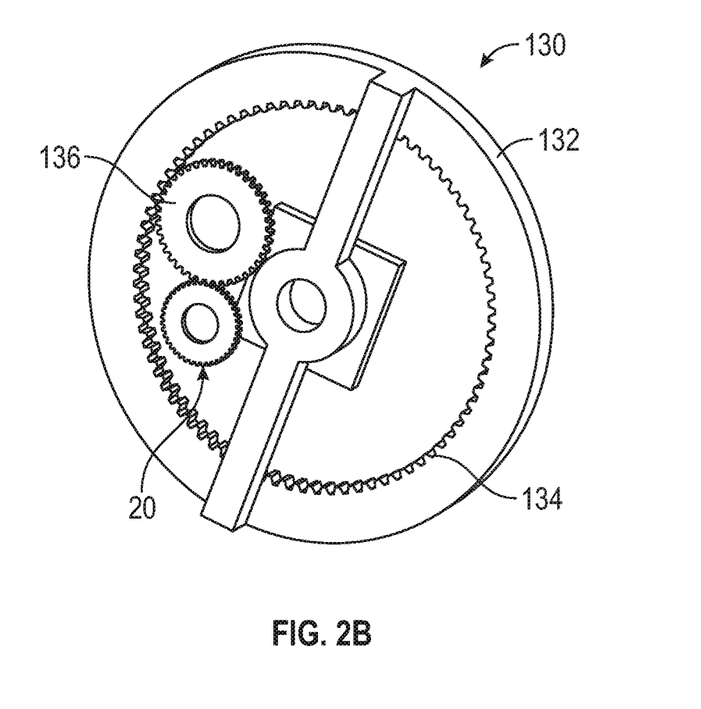

The present disclosure, as shown in FIG. 2b, contemplates yet another alternate reduction mechanism 130 that may be used in place of reduction mechanism 110. Reduction mechanism 130 includes a ring gear 132 having internal gear teeth 134. Internal gear teeth 134 mesh with the plurality of teeth on an intermediary spur gear 136. Intermediary spur gear 136 teeth mesh with the plurality of gear teeth 22 on spur gear 20 which in turn is attached to the spool (not shown). Intermediary spur gear 136 and ring gear 132 form a gear train that provides a gear reduction as desired. Thus, alternate reduction mechanism 130 starts with an input member coupled to the spool 14 through spool shaft 16 which in this embodiment is spur gear 20. The alternate reduction mechanism 130 ultimately is coupled to sensor 40. Intermediary spur gear 136 is an intermediate member that converts the relatively higher rate of movement of the spool 14 to a lower rate of movement of ring gear 132. Ring gear 132 is also a communication member which communicates the reduced rate of movement to the sensor 40.

Figure 3:
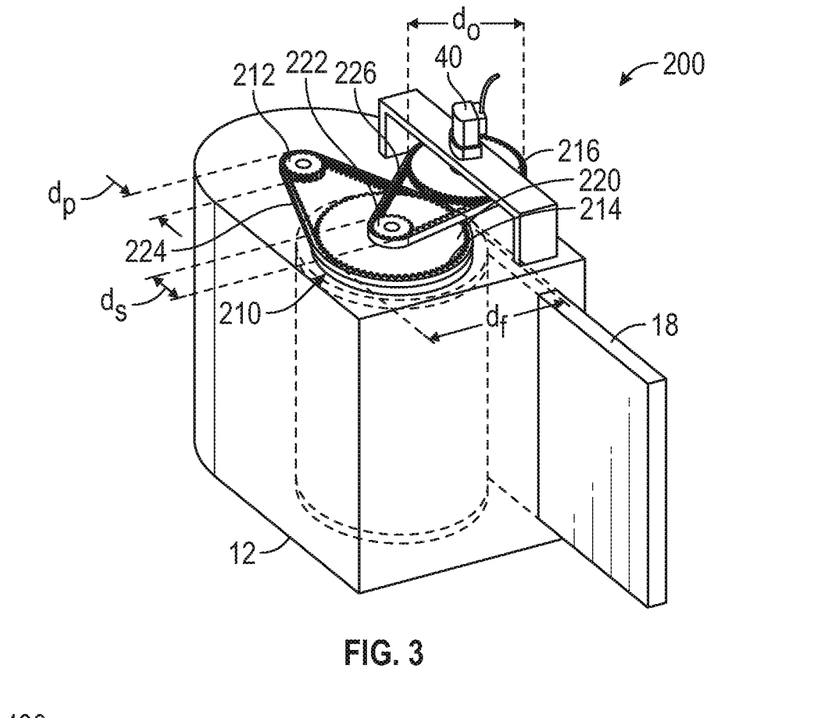
FIG. 3 is a perspective view of a seatbelt retractor having an alternate reduction mechanism according to an exemplary embodiment.

Referring now to FIG. 3, a perspective view of a seatbelt retractor 200 having an alternate reduction mechanism 210 is illustrated in accordance with yet another aspect of the invention. Seatbelt retractor 200 has the same components as seatbelt retractor 10 described above, except that spur gear 20 is replaced with a spool pulley 212 and reduction mechanism 24 is replaced with alternate reduction mechanism 210, as hereinafter specified. Spool pulley 212 has a diameter $d_p$ and is fixed for common rotation with the spool 14. In the instant embodiment, reduction mechanism 210 includes a first pulley 214 and a second pulley 216. First pulley 214 has a first pulley portion 220 having a diameter $d_f$ and a second pulley portion 222 having a diameter $d_s$. Second pulley 216 has a diameter $d_o$. A first drive belt 224 is wrapped around spool pulley 212 and first pulley portion 220 of first pulley 214. A second drive belt 226 is wrapped around second pulley portion 222 of first pulley 214 and second pulley 216. Second pulley 216 is coupled to the sensor shaft 42 of sensor 40. Moreover, sensor 40 may be mounted on either side of the second pulley 216. The diameter $d_p$ of spool pulley 212 is less than the diameter $d_f$ of the first pulley portion 220 of first pulley 214, thus a gear reduction occurs between spool pulley 212 and first pulley 214. In other words, the rate of rotation and angular rotation change of first pulley 214 is less than the rate of rotation and angular rotation change of spool pulley 212. Consequently, it will take more than one revolution of spool pulley 212 to rotate first pulley 214 one full rotation. An additional gear reduction is possible with the coupling of second pulley 216 with a second pulley portion 222 of first pulley 214 through second drive belt 226. The second gear reduction may be accomplished by selecting a second pulley 216 that has a diameter $d_o$ that is greater than the diameter df of the first portion 220 of the first pulley 214. Thus, alternate reduction mechanism 210 includes an input member coupled to the spool 14 through spool shaft 16 which in this embodiment is spool pulley 212. The alternate reduction mechanism 210 ultimately is coupled to sensor 40. Intermediate members including first pulley 214 and second pulley 216 along with first drive belt 224 and second drive belt 226 reduce the rate of movement from a relatively high rate of movement of the spool to a lower rate of movement of sensor shaft 42. Second pulley 216 is also a communication member which communicates the reduced rate of movement to the sensor 40.

Figure 4:
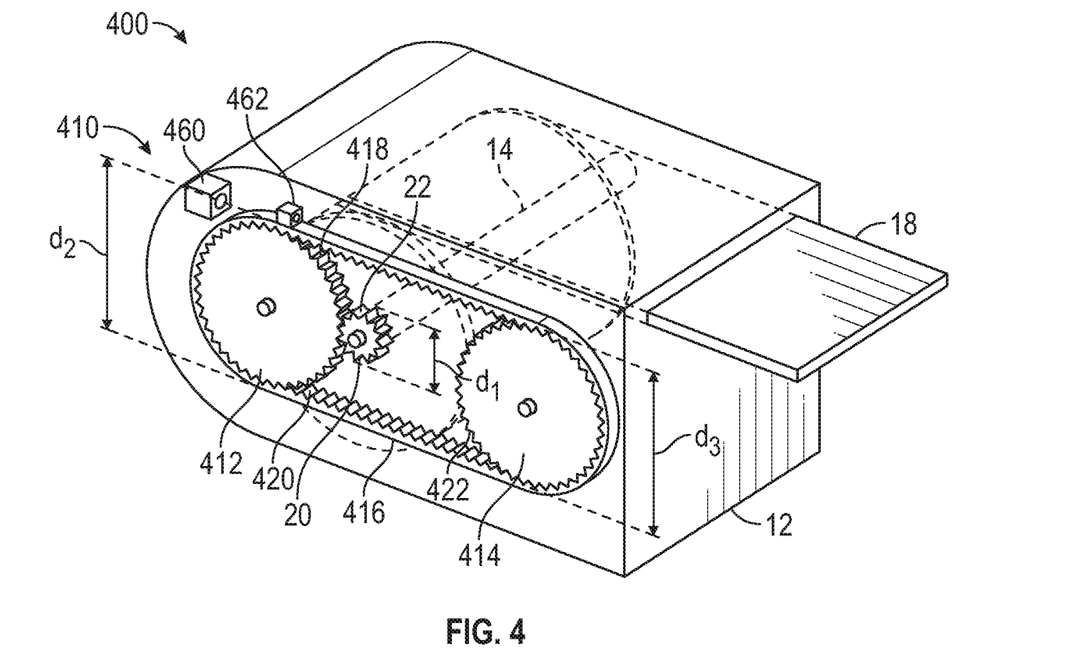
FIG. 4 is a perspective view of a seatbelt retractor having an alternate reduction mechanism according to an exemplary embodiment.

Referring now to FIG. 4, a perspective view of a seatbelt retractor 400 having an alternate reduction mechanism 410 is illustrated in accordance with yet another aspect of the invention. Seatbelt retractor 400 has the same components as seatbelt retractor 10 described above, except that reduction mechanism 24 is replaced with alternate reduction mechanism 410, as hereinafter specified. In the instant embodiment, reduction mechanism 410 includes a first spur gear 412, a second spur gear 414 and a toothed chain or belt 416. The first spur gear 412 has a plurality of gear teeth 418 that mesh with the plurality of gear teeth 22 on spur gear 20 and with a plurality of gear teeth 420 on belt 416. The second spur gear 414 has a plurality of gear teeth 422 that mesh with the plurality of gear teeth 420 on belt 416. Spur gear 20 has a diameter $d_1$, first spur gear 412 has a gear diameter $d_2$ and second spur gear 414 has a diameter $d_3$. The diameter $d_1$ of spur gear 20 is less than the diameter $d_2$ of first spur gear 412, thus a gear reduction occurs between spur gear 20 and first spur gear 412. In other words, the rate of rotation and angular rotation change of first spur gear 412 is less than the rate of rotation and angular rotation change of spur gear 20. Consequently, it will take more than one revolution of spur gear 20 to rotate first spur gear 412 one full rotation. A sensor 460 such as an optical sensor or magnetic field sensor located on frame 12 senses a sensed element 462 mounted on belt 416. The number of rotations of spur gear 20 and thus spool 14 may be determined from the distance the sensed element 462 has traveled towards or away from sensor 460. Thus, alternate reduction mechanism 410 includes an input member coupled to the spool 14 through spool shaft 16 which in this embodiment is spur gear 20. The alternate reduction mechanism 410 ultimately is coupled to sensed element 462 that cooperates with sensor 460. First spur gear 412 is an intermediate member that reduces the rate of movement from a relatively high rate of movement of the spur gear 20 to a lower rate of movement of sensed element 462 through second spur gear 412 and belt 416. First spur gear 412, belt 416, and second spur gear 414 act as communication members which communicate the reduced rate of movement to the sensor 460.

Figure 5:
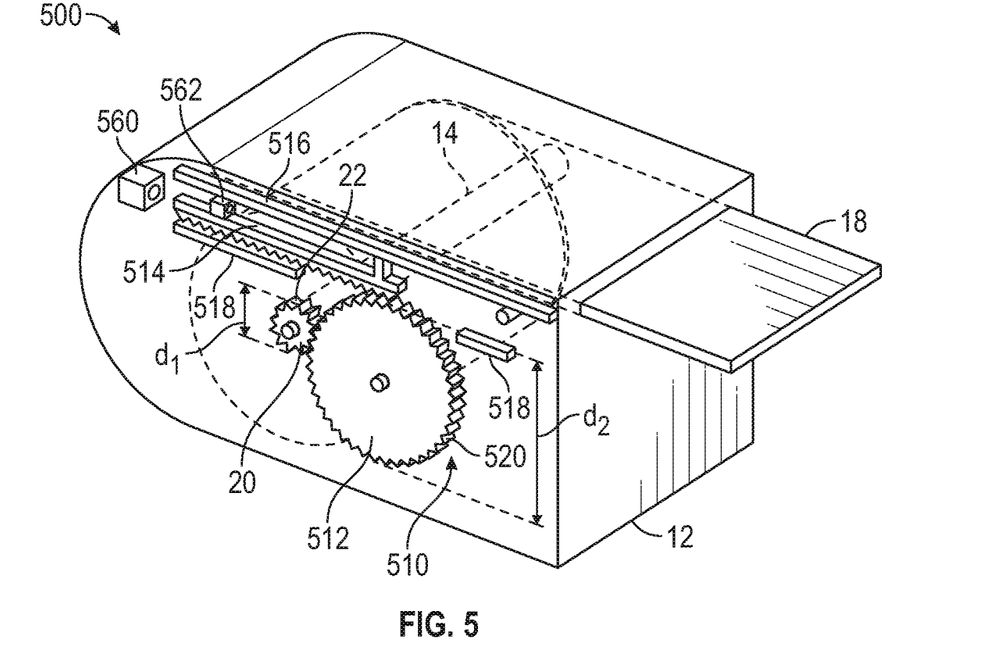
FIG. 5 is a perspective view of a seatbelt retractor having an alternate reduction mechanism according to an exemplary embodiment.

Referring now to FIG. 5, a perspective view of a seatbelt retractor 500 having an alternate reduction mechanism 510 is illustrated in accordance with yet another aspect of the invention. Seatbelt retractor 500 has the same components as seatbelt retractor 10 described above, except that reduction mechanism 24 is replaced with alternate reduction mechanism 510, as hereinafter specified. In the instant embodiment, reduction mechanism 510 includes a first spur gear 512, a toothed rack 514 and upper and lower rails 516 and 518. The first spur gear 512 has a plurality of gear teeth 520 that mesh with the plurality of gear teeth 22 on spur gear 20. The upper and lower rails 516 and 518 are fixedly secured to the frame 12 of retractor 500. Toothed rack 514 is slidably engaged between upper and lower rails 516 and 518. Spur gear 20 has a diameter $d_1$ and first spur gear 512 has a gear diameter $d_2$. The diameter $d_1$ of spur gear 20 is less than the diameter $d_2$ of first spur gear 512, thus a gear reduction occurs between spur gear 20 and first spur gear 512. In other words, the rate of rotation and the angular rotation change of first spur gear 512 is less than the rate of rotation and the angular rotation change of spur gear 20. Consequently, it will take more than one revolution of spur gear 20 to rotate first spur gear 512 one full rotation. An optical sensor or magnetic field sensor 560 located on frame 12 and senses a sensed element 562 mounted on rack 514. The number of rotations of spur gear 20 and, thus, spool 14 may be determined from the distance the sensed element 562 has traveled towards sensor 560. Thus, alternate reduction mechanism 510 includes an input member coupled to the spool 14 through spool shaft 16 which in this embodiment is spur gear 20. The alternate reduction mechanism 510 ultimately is coupled to sensed element 562 that cooperates with sensor 560. First spur gear 512 is an intermediate member that reduces the rate of movement from a relatively high rate of movement of the spur gear 20 to a lower rate of movement of the sensed element 562 through toothed rack 514. Toothed rack 514, sensed element 562, and first spur gear 512 act as communication members which communicate the reduced rate of movement to the sensor 560.

Figure 6:
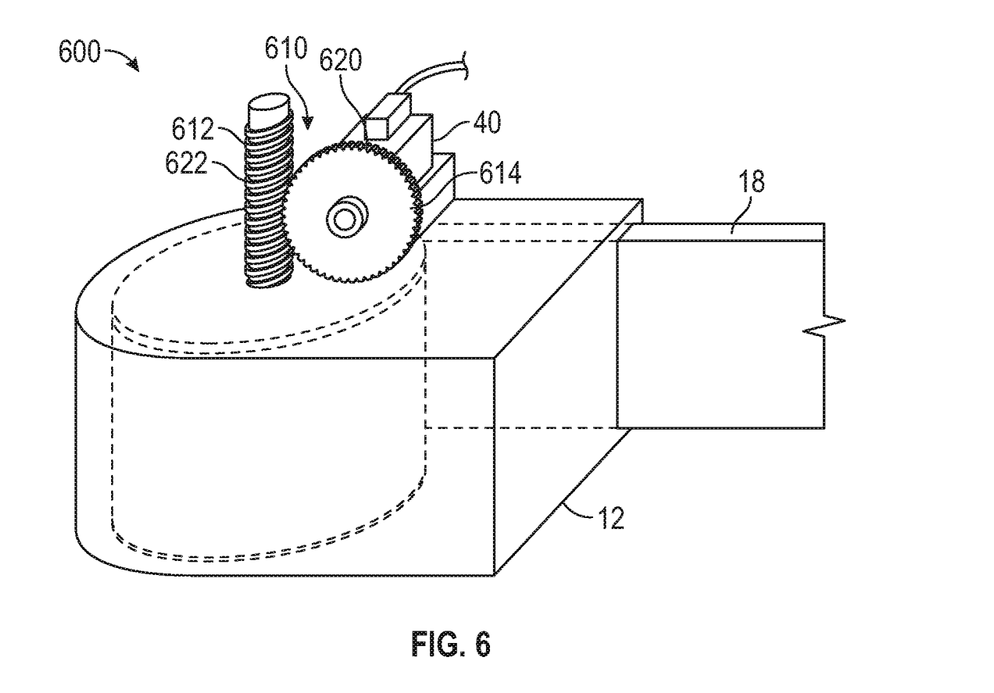
FIG. 6 is a perspective view of a seatbelt retractor having an alternate reduction mechanism according to an exemplary embodiment.

Referring now to FIG. 6, a perspective view of a seatbelt retractor 600 having an alternate reduction mechanism 610 is illustrated in accordance with yet another aspect of the invention. Seatbelt retractor 600 has the same components as seatbelt retractor 10 described above, except that spur gear 20 is replaced with a worm gear 612 and reduction mechanism 24 is replaced with alternate reduction mechanism 610, as hereinafter specified. In the instant embodiment, reduction mechanism 610 includes a first spur gear 614. The first spur gear 614 has a plurality of gear teeth 620 that mesh with the plurality of gear teeth 622 on worm gear 612. The gear pitch on worm gear 612 and the diameter of spur gear 614 will dictate a gear reduction between the worm gear and the spur gear 614. In other words, the rate of rotation and angular rotation change of spur gear 614 will be less than the rate of rotation and angular rotation change of worm gear 612. Consequently, it will take more than one revolution of worm gear 612 to rotate spur gear 614 one full rotation. The same sensor 40 or potentiometer having a shaft fixed for common rotation with spur gear 614 may be used in the instant embodiment to output a response level that may be correlated to the number of rotations of worm gear 612 and thus spool 14. Thus, alternate reduction mechanism 610 includes an input member coupled to the spool 14 through spool shaft 16 which in this embodiment is a worm gear 612. The alternate reduction mechanism 610 ultimately is coupled to sensor 40. Spur gear 614 is an intermediate member that reduces the rate of movement from a relatively high rate of movement of the spur gear 614 to a lower rate of movement of worm gear 612, in this case. Spur gear 614 is also a communication member that communicates the reduced rate of movement to the sensor 40. Moreover, sensor 40 may be mounted on either side of the spur gear 614.

Figure 7:
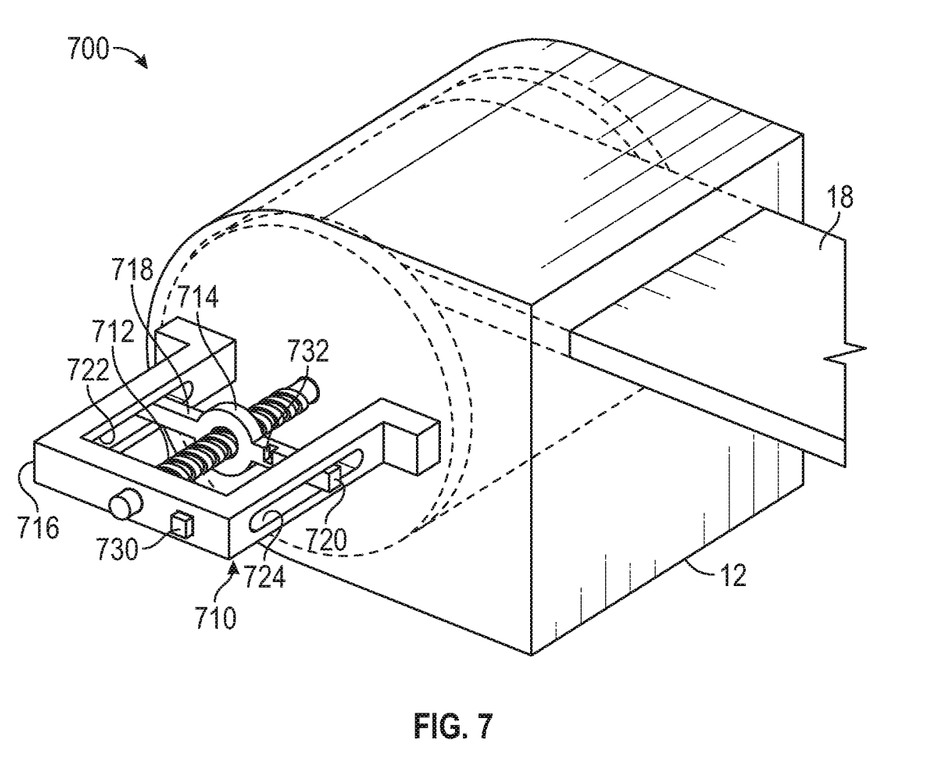
FIG. 7 is a perspective view of a seatbelt retractor having an alternate reduction mechanism according to an exemplary embodiment.

Referring now to FIG. 7, a perspective view of a seatbelt retractor 700 having an alternate reduction mechanism 710 is illustrated in accordance with yet another aspect of the invention. Seatbelt retractor 700 has the same components as seatbelt retractor 10 described above, except that spur gear 20 is replaced with a worm gear 712 and reduction mechanism 24 is replaced with alternate reduction mechanism 710, as hereinafter specified. In the instant embodiment, reduction mechanism 710 includes a threaded nut 714 and a guide bracket 716. Guide bracket 716 is fixedly secured to the frame 12 of retractor 700 and may or may not be part of a cover. The threaded nut 714 has an anti-rotation member consisting of a pair of wing members 718, 720 that are slidably engaged or captured in a first and second slot 722 and 724 of guide bracket 716, respectively. The gear pitch on worm gear 712 and threaded nut 714 will dictate the distance the threaded nut will travel up or down the worm gear 712 as the spool 14 rotates. Consequently, it will take more than one revolution of spool 14 to move threaded nut 714 towards the end of the bracket. A sensor 730 such as an optical sensor or magnetic field sensor located on frame 12 senses sensed element 732 mounted on wing member 720. The number of rotations of worm gear 712 and thus spool 14 may be determined from the distance the target 732 has traveled towards or away from sensor 730. Thus, alternate reduction mechanism 710 includes an input member coupled to the spool 14 through spool shaft 16 which in this embodiment is worm gear 712. The alternate reduction mechanism 710 ultimately is coupled to sensed element 732 that cooperates with sensor 730. Threaded nut 714 including wing member 720 is an intermediate o member that reduces the rate of movement from a relatively high rate of movement of the worm gear 712 to a lower rate of movement of sensed element 732. Threaded nut 714, wing member 720 and sensed element 732 act as communication members which communicate the reduced rate of movement to the sensor 730.

In another aspect of the present disclosure, a method for sensing seatbelt webbing payout from a seatbelt retractor is provided. The method includes: providing a retractor frame, providing a spool fixed for common rotation with a spool shaft, wrapping a seatbelt webbing around the spool, coupling a reduction mechanism to the spool shaft, and sensing the movement of the spool using a sensor coupled to the reduction mechanism. The spool shaft is rotatably supported in the retractor frame. A rate of movement of the spool shaft is higher than a rate of movement of the reduction mechanism.

The method of the present disclosure offers several advantages. Since the rate of movement of the reduction mechanism is lower than a rate of movement of the spool shaft, different sensor types may be used to sense the movement or rotation of the spool, including those that measure less than one full rotation. For example, sensors for sensing linear motion of the output member such as optical sensors, inductive including: linear-variable-differential transformers, linear variable reluctance transducers, and linear variable inductance transducers, magnetic or eddy current, time of flight sensors: laser, ultrasonic, magnetorestrictive linear displacement sensor, capacitive, pulse encoding sensors, and contact based sensors such as resistive sensors (string potentiometer). Sensors for sensing rotary motion of the output member may be, for example, magnetorestrictive, magnetic sensors including: variable reluctance, eddy current killed oscillator, wiegand sensor and hall effect sensor, and incremental rotary encoders (optical), absolute encoder, inductive rotary sensor, and reflective optical sensors.

The method further includes, in one aspect of the disclosure, attaching a spool spur gear to the spool shaft and coupling the spool spur gear to a first spur gear of the reduction mechanism. The first spur gear of the reduction mechanism meshes with a second spur gear of the reduction mechanism. The method further includes coupling a potentiometer having a potentiometer shaft fixed to the second spur gear of the reduction mechanism. Rotation of the second spur gear changes an associated resistance level or voltage in the potentiometer. The resistance or voltage level in the potentiometer is correlated to the payout of the seatbelt webbing. Thus, a lookup table that stores values of resistance or voltage and associated seatbelt payout may be accessed by a control algorithm to determine seatbelt payout. A correction factor to account for the effect of the amount of webbing (diameter of the webbing and associated circumference) on the seatbelt retractor spool may also be employed by the control algorithm.

The present disclosure contemplates several variations to the embodiment described above, for example, additional spur gears may be incorporated into the reduction mechanism to form a gear train with more than two gears. Moreover, the spur gears in the gear trains described above may provide a gear reduction and other gear arrangements may provide the opposite effect. In addition, the gear reduction mechanism described above could be part of an automatic locking retractor feature mechanization or a mechanism to prevent entrapment of people in the seatbelt webbing. It should be understood from the present disclosure that gears may be in communication with each other by directly meshing or through intermediary gears that are directly meshing. In addition, wherever "rate of movement" is used in the present disclosure it is contemplated that "magnitude of movement" may be substituted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A seatbelt retractor, the seatbelt retractor comprising:
a retractor frame;
a spool fixed for common rotation with a spool shaft, wherein the spool shaft is rotatably supported in the retractor frame;
a seatbelt webbing wrapped around the spool;
a reduction mechanism coupled to the spool shaft, for receiving a first rate of movement of the spool and converting the first rate of movement of the spool to a second rate of movement of the reduction mechanism, wherein the first rate of movement is greater than the second rate of movement; and
a sensor in communication with the reduction mechanism for sensing the movement of the spool,
wherein the sensor is fixed to a sensor mounting bracket and includes a sensor shaft for common rotation with an output spur gear disposed in the reduction mechanism, thereby rotation of the output spur gear changes a response level in the sensor, wherein the output spur gear is in communication with an input member pear, the input member gear attached for common rotation with the spool.

2. The seatbelt retractor of claim 1, wherein the sensor is a potentiometer having a potentiometer shaft fixed for common rotation with the output spur gear, thereby rotation of the output spur gear changes a response level in the potentiometer.

3. The seatbelt retractor of claim 1 wherein the reduction mechanism is coupled to a gear of an automatic locking retractor mechanism.

4. The seatbelt retractor of claim 1, wherein the sensor mounting bracket defines an aperture and the sensor shaft extends through the aperture.

5. The seatbelt retractor of claim 1, wherein the sensor mounting bracket is attached to the retractor frame.

6. A method for sensing seatbelt webbing payout from a seatbelt retractor, the method comprising:
providing a retractor frame;
providing a spool fixed for common rotation with a spool shaft, wherein the spool shaft is rotatably supported in the retractor frame;
wrapping a seatbelt webbing around the spool;
coupling a reduction mechanism to the spool shaft, wherein a rate of movement of the spool shaft is higher than a rate of movement of a reduction mechanism output; and
sensing movement of the spool shaft using a sensor in communication with the reduction mechanism,
wherein the sensor is attached to a sensor mounting bracket and includes a sensor shaft fixed relative to the sensor mounting bracket for common rotation with an output spur gear disposed in the reduction mechanism, thereby rotation of the output spur gear changes a response level in the sensor, wherein the output spur gear is in communication with an input member gear, the input member gear attached for common rotation with the spool.

7. The method of claim 6, further comprising attaching the input member gear to the spool shaft and coupling the input member gear to output spur gear in the reduction mechanism.

8. The method of claim 6, wherein coupling the reduction mechanism further comprises coupling a communication member that communicates the rate of movement the reduction mechanism output to the sensor.

9. A seatbelt retractor, the seatbelt retractor comprising:
a retractor frame;
a spool fixed for common rotation with a spool shaft, wherein the spool shaft is rotatably supported in the retractor frame;
a seatbelt webbing wrapped around the spool;
a spool gear fixed for common rotation with the spool shaft;
a reduction mechanism coupled to the spool shaft, for receiving a first rate of movement of the spool and converting the first rate of movement of the spool to a second rate of movement of the reduction mechanism, wherein the first rate of movement is greater than the second rate of movement;
a sensor mounting bracket attached to the retractor frame; and
a sensor mounted to the sensor mounting bracket, the sensor including a sensor shaft for common rotation with an output spur gear disposed in the reduction mechanism, thereby rotation of the output spur gear changes a response level in the sensor, wherein the output spur gear is in communication with an input member gear, the input member gear attached for common rotation with the spool,
wherein the sensor shaft extends through an aperture defined within the sensor mounting bracket.

* * * * *